(12) United States Patent
Deker et al.

(10) Patent No.: US 7,925,394 B2
(45) Date of Patent: Apr. 12, 2011

(54) METHOD OF FORMING A 3D SAFE EMERGENCY DESCENT TRAJECTORY FOR AIRCRAFT AND IMPLEMENTATION DEVICE

(75) Inventors: Guy Deker, Cugnaux (FR); Nicolas Marty, Saint Sauveur (FR); François Coulmeau, Seilh (FR)

(73) Assignee: Thales (FR)

( * ) Notice: Subject to any disclaimer, the term of this patent is extended or adjusted under 35 U.S.C. 154(b) by 853 days.

(21) Appl. No.: 11/870,338

(22) Filed: Oct. 10, 2007

(65) Prior Publication Data
US 2008/0177432 A1 Jul. 24, 2008

(30) Foreign Application Priority Data

Oct. 10, 2006 (FR) .................................. 06 08870

(51) Int. Cl.
G01C 21/18 (2006.01)
(52) U.S. Cl. .............................. 701/18; 244/175; 701/16
(58) Field of Classification Search ................. 701/3–18; 244/175, 75.1, 76 R; 340/947, 948
See application file for complete search history.

(56) References Cited

U.S. PATENT DOCUMENTS

| | | | |
|---|---|---|---|
| 6,097,996 A | 8/2000 | Deker | |
| 6,161,063 A | 12/2000 | Deker | |
| 6,173,219 B1 | 1/2001 | Deker | |
| 6,181,987 B1 | 1/2001 | Deker et al. | |
| 6,269,301 B1 | 7/2001 | Deker | |
| 7,433,781 B2 | 10/2008 | Bitar et al. | |
| 7,492,307 B2 | 2/2009 | Coulmeau | |
| 7,493,197 B2 | 2/2009 | Bitar et al. | |
| 7,693,624 B2 * | 4/2010 | Duggan et al. | 701/24 |
| 7,839,322 B2 * | 11/2010 | Filias et al. | 342/33 |
| 2005/0283306 A1 | 12/2005 | Deker | |
| 2007/0031007 A1 | 2/2007 | Bitar | |
| 2007/0053609 A1 | 3/2007 | Bitar et al. | |
| 2007/0078572 A1 | 4/2007 | Deker et al. | |
| 2007/0078591 A1 | 4/2007 | Meunier et al. | |
| 2007/0078592 A1 | 4/2007 | Meunier et al. | |
| 2007/0088492 A1 | 4/2007 | Bitar et al. | |
| 2007/0129855 A1 | 6/2007 | Coulmeau | |
| 2007/0142981 A1 | 6/2007 | Gutierrez-Castaneda et al. | |

(Continued)

FOREIGN PATENT DOCUMENTS

EP 0 826 946 3/1998

(Continued)

OTHER PUBLICATIONS

U.S. Appl. No. 11/912,243, filed Oct. 22, 2007, Fabre et al. (Not Yet Published).
U.S. Appl. No. 11/683,989, filed Mar. 8, 2007, Lorido et al. (Not Yet Published).

(Continued)

*Primary Examiner* — Richard M. Camby
(74) *Attorney, Agent, or Firm* — Lowe Hauptman Ham & Berner, LLP

(57) ABSTRACT

The method in accordance with the invention is a method of providing a 3D emergency descent trajectory for aircraft comprising the steps of searching for at least one possible better trajectory allowing a secure continuation in relation to the relief and/or the surrounding conditions towards a homing point as soon as a situation requiring an unscheduled modification of the current trajectory occurs, wherein this trajectory is updated as a function of the alterations in the surrounding conditions, as a function of the information provided by the onboard sensors and/or outside information received.

11 Claims, 10 Drawing Sheets

U.S. PATENT DOCUMENTS

| | | |
|---|---|---|
| 2007/0150117 A1 | 6/2007 | Bitar et al. |
| 2007/0150121 A1 | 6/2007 | Bitar et al. |
| 2007/0150170 A1 | 6/2007 | Deker |
| 2007/0174005 A1 | 7/2007 | Bitar et al. |
| 2007/0179703 A1 | 8/2007 | Soussiel et al. |
| 2007/0187554 A1 | 8/2007 | Bitar et al. |
| 2007/0215745 A1 | 9/2007 | Fleury et al. |
| 2007/0219678 A1 | 9/2007 | Coulmeau |
| 2007/0219679 A1 | 9/2007 | Coulmeau |
| 2007/0219705 A1 | 9/2007 | Bitar et al. |
| 2007/0225876 A1 | 9/2007 | Caillaud et al. |
| 2007/0250223 A1 | 10/2007 | Francois et al. |
| 2007/0276553 A1 | 11/2007 | Bitar et al. |
| 2007/0285283 A1 | 12/2007 | Bitar et al. |
| 2008/0046171 A1 | 2/2008 | Bitar et al. |
| 2008/0059058 A1 | 3/2008 | Caillaud et al. |
| 2008/0065312 A1 | 3/2008 | Coulmeau et al. |
| 2008/0065352 A1 | 3/2008 | Coulmeau |
| 2008/0086243 A1 | 4/2008 | Caillaud et al. |
| 2008/0174454 A1 | 7/2008 | Bitar et al. |
| 2008/0177432 A1 | 7/2008 | Deker et al. |

FOREIGN PATENT DOCUMENTS

| | | |
|---|---|---|
| EP | 0826946 | 3/1998 |
| FR | 2 860 292 | 4/2005 |
| FR | 2860292 | 4/2005 |
| FR | 2861478 | 4/2005 |
| FR | 2864312 | 6/2005 |
| FR | 2867270 | 9/2005 |
| FR | 2867851 | 9/2005 |
| FR | 2892192 | 4/2007 |
| FR | 2894367 | 6/2007 |
| FR | 2894368 | 6/2007 |
| FR | 2897449 | 8/2007 |

OTHER PUBLICATIONS

"Operations for Aircraft at Altitudes Above 25,2000 FT", (FAA-AC61-107A), Department of Transportation, Federal Aviation Administration, Jan. 2, 2003, Initiated by: AFS-820, Printed from Summit Aviation's Computerized Aviation Reference Library, Jul. 15, 2005, pp. 1-28.

ARINC 702 Standard, "Advanced Flight Management Computer System", ARINC Characteristic 702A-2, published Jun. 30, 2005.

* cited by examiner

METHOD OF FORMING A 3D SAFE EMERGENCY DESCENT TRAJECTORY FOR AIRCRAFT AND IMPLEMENTATION DEVICE

RELATED APPLICATIONS

The present application is based on, and claims priority from, France Application Number 06 08870, filed Oct. 10, 2006, the disclosure of which is hereby incorporated by reference herein in its entirety.

FIELD OF THE INVENTION

The present invention pertains to a method of forming a 3D safe emergency descent trajectory for aircraft as well as to a device for implementing this method.

BACKGROUND OF THE INVENTION

Exceptional situations, in particular those requiring a safe descent in proximity to the relief, require fast decisions to be taken under conditions of extreme stress.

The first few minutes after detecting an incident are critical and a bad decision can have serious consequences on the continuation of the flight or the workload imposed on the crew to deal with it or rectify it.

The problems posed by an emergency descent have been mentioned for example in the following publications:
- the safety bulletin of the FAA, according to which the emergency descent involves concepts of steep angles of descent, high speeds and sweaty palms,
- the article "Training and proficiency" (AMCC III.d), according to which a complex emergency situation would involve implementing one or more emergency procedures, redefining a trajectory and a descent profile and communicating to the air traffic control the three essential items of information in regard to air traffic control, namely the nature of the emergency situation, the quantity of fuel remaining and the number of persons aboard. Furthermore, in an emergency situation, the paramount obligation of the pilot is to continue to pilot the aircraft in a secure and professional manner despite the surrounding situation, and he must systematically apply the procedures in force.
- According to the publication "OPERATIONS FOR AIRCRAFT AT ALTITUDES ABOVE 25,000 FT—(FAA-AC61-107A)", the Effective Performance Time or EPT or the Time of Useful Consciousness or TUC is the time span during which a pilot is able to fulfil his duty in an effective or appropriate manner despite the rarefaction in oxygen. The value of the EPT decreases as a function of altitude until it coincides with the time necessary for the blood to pass from the lungs to the head and usually determined for an altitude of greater than 10,000 metres. The TUC is, for a standard ascent speed, from about 2.5 to 3 min (for an altitude of about 7,500 m) and from about 9 to 12 s (for an altitude of about 15,000 m), while it is, in the event of fast decompression, from 1.5 to 2.5 min and 5 s for the same altitudes, respectively.

Three cases of aircraft that encountered meteorological problems or a probable depressurization problem and that crashed in mountains or in proximity to a town may be cited, for the year 2005, to illustrate the dangerousness of such emergency situations.

Among the existing onboard systems to which it would be possible to resort to aid the pilot in an emergency situation of the type of those cited above, may be cited:

The ISS/TAWS systems ("Terrain Awareness and Warning System" in the guise of autonomous computer or one integrated with the TCAS and WXR functions in an ISS "Integrated Surveillance System") which fulfil a primary terrain anticollision monitoring function ("Safety Net") and the aim of which is to emit audible alerts during an exceptional approach to the relief allowing the crew to react by engaging a vertical resource before it is too late. Accordingly, TAWS systems, decoupled from navigation systems, periodically compare the theoretical trajectory that the aircraft would describe during a resource and compare it with a section through the terrain overflown, obtained on the basis of a worldwide digital terrain model aboard the computer.

The availability of a model of the terrain permits secondary functions making it possible to improve the perception of the situation of the crew ("Situation Awareness"). Among them, the THD ("Terrain Hazard Display") is described in TSO-c151b of the TAWS and its objective is a representation of the vertical margins relating to the altitude of the aircraft as slices of false colours presented on the navigation screen. TAWSs of class A, compulsory for commercial transport aeroplanes, generally have a simplified cartographic mode with a few hypsometric slices (the ELEVIEW mode for the $T^2CAS$ from THALES), making it possible to have available a representation of the terrain during cruising flight phases.

The false colour representations are currently limited by the ARINC-453 display standards (of WXR type) and by the certification constraints which lead to an intentional degradation in the resolution of the graphical representations proposed so as not to allow their use for navigation, which is incompatible with the certification level defined for a TAWS.

The functions carried out by a TAWS are insufficient to make it possible, whatever the causes of an emergency situation (meteorology, depressurization, engine failure, navigation, medical emergency, etc.), to rapidly and definitively choose a valid descent trajectory until the aircraft is made safe so as to allow the crew to distribute its workload over the other tasks necessary for safeguards and for resolving the problems encountered.

Specifically, the THD proposes a terrain representation limited to 1500 feet under the aircraft, a margin which is largely insufficient to anticipate the dangers during a descent from a cruising regime. The known hypsometric representation devices propose a simplified cartographic representation dissociated from the concept of local safety altitude or values related to emergency descent procedures. These two display modes propose substantially horizontal relief sections for which the representation level is decorrelated from the ability of the aircraft to actually attain this zone, thereby rendering them unsuitable for representing the zones that the aircraft can reach in emergency situations such as those cited above.

Furthermore, the resolution of digital terrain models of the order of 15 seconds of arc (or less) is too high in regard to the operational margins required for the situations envisaged and in fact noncertifiable for navigation functions, and the data of the TAWS do not make it possible to ensure automatic tracking of the trajectory, or to access the navigation data, or to access the performance model to make predictions of (vertical profile, flight time and fuel consumption necessary for defining the zones and procedures that are achievable).

European patent application 0 826 946 discloses a method of assisting piloting, but this document pertains only to the avoidance of a dangerous zone and not to the formulation of the shortest possible safe emergency descent trajectory.

SUMMARY OF THE INVENTION

The object of the present invention is a method of forming a 3D safe emergency descent trajectory for aircraft, with a view to improving the safety of the flight during operational situations requiring a non-schedulable modification of the combined flight plan, if appropriate, to a descent towards flight levels situated in proximity to reliefs. The situations envisaged are, inter alia:

Fast descent, or "Power dive", following depressurization, a zone of strong turbulence or icing, or a bomb alert. The homing trajectory to get to a determined point must bring the aircraft to a flight level compatible with the emergency conditions encountered, without necessarily attempting to get home to an airport.

Altitude drift, or "Drift down", following a partial loss of propulsion. The homing trajectory must make it possible to get home to an airport on which the inspections and repairs required can be carried out by skilled maintenance teams.

Descent under glided flight, or "Power off dive", imposed by the complete loss of propulsion. The homing trajectory must make it possible to get home rapidly to an airport while circumventing the reliefs.

Medical emergencies requiring fast homing to an airport suitable for the care required by the passenger or the crew member in difficulty.

Incidents making it necessary to attain an airport suitable for a safety inspection of the aircraft by skilled maintenance teams. The homing trajectory must make it possible to comply with constraints on flight time or limiting rudder movements.

The improvement in safety must comply with the following factors:

Reduction in crew stress by automatically proposing a solution for making the aircraft safe that guarantees strict compliance with the safety minima required by the air regulations and the performance of the aircraft (shrewdness, crossable distance, etc.), Reduction in the time to formulate the trajectory to make the aircraft safe, making it possible to drastically reduce the time of exposure to the conditions of hypoxia (case of depressurization) or to improve the crossable distance by rapidly activating the flight conditions with the greatest shrewdness towards a destination that can definitely be reached (in the event of engine failure), Reduction in the workload of the crew when dealing with the emergency situation, by avoiding the successive re-evaluations of the trajectory chosen in the course of the descent, so freeing up that much time to solve the cause of the emergency situation or to carry out the other actions required ("check-lists", ATC contact, TCAS conflict avoidance, etc.)

The method of the invention advantageously makes it possible to automatically formulate:

The acquisition and the characterization of conditions aboard the aircraft corresponding to a situation requiring an unscheduled descent to flight levels in proximity to reliefs, The formulation of the vertical flight profile suited to the aerodynamic and structural possibilities of the aircraft for the management of the operational descent situation detected, The establishment of the mapping of the geographical zones that can be reached according to the descent profile complying with the regulatory operational lateral margins with respect to the surrounding reliefs, to the controlled air navigation zones and to the risky atmospheric phenomena, The sorting of the possible destinations for the aircraft according to priority rules imposed by the procedures applicable in the operational descent situation detected, the navigation capabilities of the aircraft (crossable distance, limitation of the rudders, etc.), the determined geographical zones that can be reached as well as the preferences of the operating company, The proposal of a flight plan section making it possible to attain the destination designated by the crew while complying with the descent profile required and the regulatory operational margins, Interaction with the crew allowing them to activate the functions used, to designate the desired destination for the aircraft and to select the activation of automation of the tracking of the trajectory thus scheduled.

The object of the present invention is also a device for implementing the aforesaid method, which device uses only the hardware means commonly available in aircraft, and requires only a minimum of modifications of these existing means.

The method in accordance with the invention is a method of providing a 3D safe emergency descent trajectory for aircraft, and it is characterized in that, as soon as a situation requiring an unscheduled modification of the current trajectory occurs, a search is made for at least one possible better descent trajectory allowing the secure continuation in relation to the relief and/or the surrounding conditions towards a homing point, this trajectory being updated as a function of the alterations in the surrounding conditions, as a function of the information provided by the onboard sensors and/or outside information received.

In an advantageous manner, the emergency descent trajectory results from a compromise between the obtaining of sufficient safety margins with respect to the surrounding terrain or to the zones to be avoided and the distance remaining to be travelled before a landing.

The device for implementing the method of the invention is characterized in that it comprises:

a computer and the following elements which are connected to it:
an operational situation detection device,
a database of performance of the aircraft,
a navigation database,
a terrain database,
a device for calculating vertical descent and holding profiles, for calculating speed along this profile, for calculating flight times, and times of transit through determined points of the trajectory,
a device for drawing up the sorted list of the procedures implementable by the aircraft,
a device for drawing up the mapping of the zones that it is possible to reach,
a device determining the path required to reach the selected destination, and
a device for evaluating the operational situation.

BRIEF DESCRIPTION OF THE DRAWINGS

The present invention will be better understood on reading the detailed description of an embodiment, taken by way of nonlimiting example and illustrated by the appended drawing, in which.

DETAILED DESCRIPTION OF THE INVENTION

The invention is described below with reference to various emergency situations that may arise for an aircraft, but it is of course understood that it can also be implemented for various other types of flying craft, such as drones, whatever the emergency situations that may arise.

Figure 1:
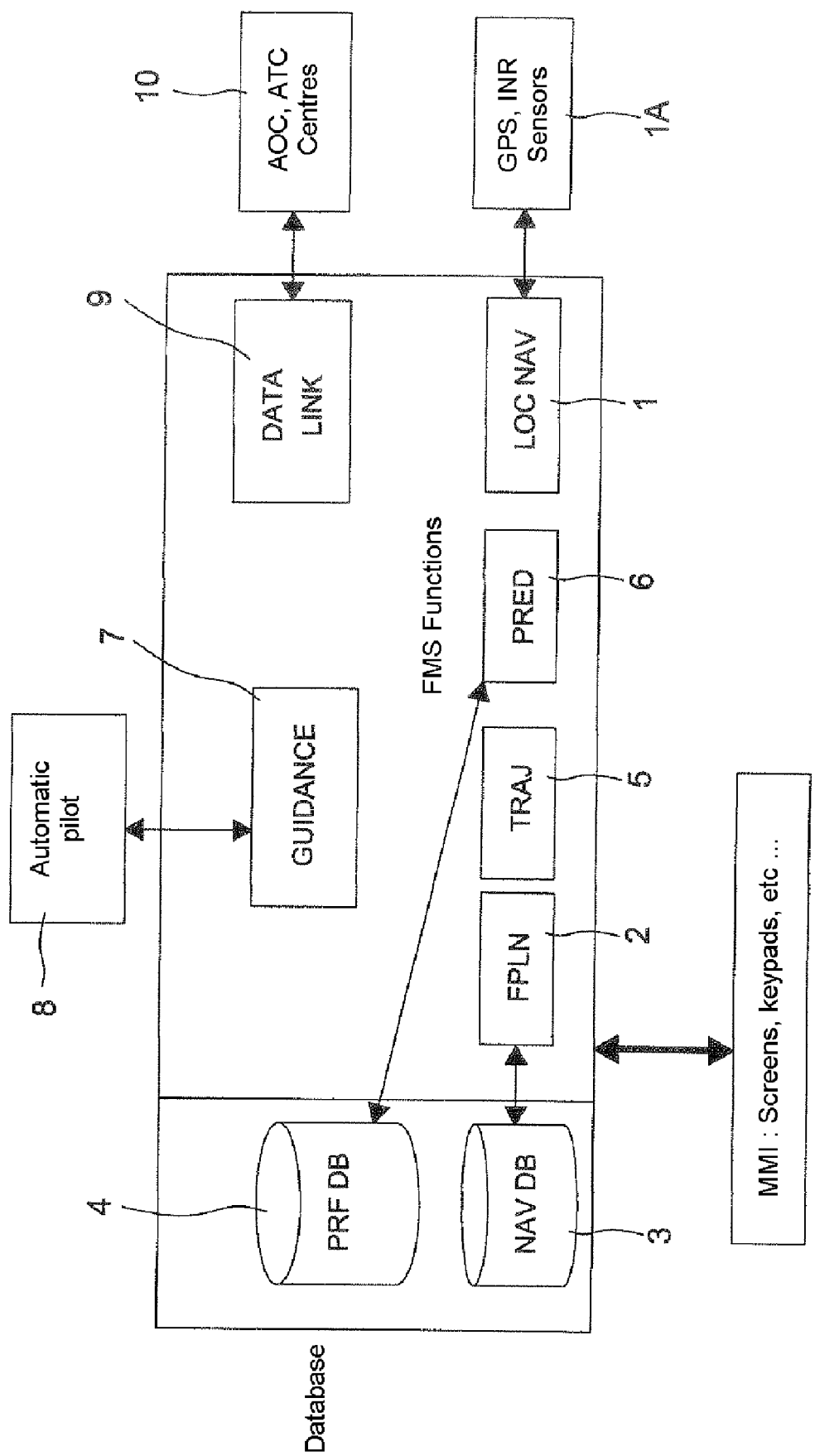
FIG. 1 is a simplified block diagram of a conventional aircraft flight management device (termed FMS)

In the simplified block diagram of a conventional aircraft flight management device (termed FMS) of FIG. 1, which is furnished with a man-machine interface MMI, the following FMS functions, described in the ARINC 702 standard (Advanced Flight Management Computer System, Dec 1996), have been represented. They normally ensure all or some of the functions of:

Navigation LOCNAV, referenced 1, to perform optimal location of the aircraft as a function of the geo-locating means (GPS, GALILEO, VHF radio beacons, inertial platforms, referenced 1A as a whole), Flight plan FPLN, referenced 2, to input the geographical elements constituting the skeleton of the route to be followed, namely: departure and arrival procedures, waypoints, airways, Navigation database NAV DB, referenced 3, for constructing geographical routes and procedures from data included in the bases (points, beacons, interception or altitude "legs", etc.), Performance database PRF DB, referenced 4, containing the aerodynamic parameters and those of the engines of the craft, Lateral trajectory TRAJ, referenced 5, for constructing a continuous trajectory on the basis of the points of the flight plan, complying with the performance of the aircraft and the confinement constraints (RNP);

Prediction function PRED, referenced 6, for constructing a vertical profile that is optimized over the lateral trajectory, Guidance, GUID, referenced 7, for guiding the aircraft in the lateral and vertical planes over its 3D trajectory, while optimizing the speed, in conjunction with the automatic pilot 8, Digital data link "DATALINK", referenced 9, for communicating with the control centres and the other aircraft, referenced 10.

The functions accessible via an FMS of the type of that presented above, in particular for the creation of a flight plan, are insufficient to achieve the objectives of the invention. Specifically, the creation of a flight plan does not verify the intersection of the proposed trajectory with the relief, and the FMS does not have a digital terrain model making it possible to carry out the calculations regarding interference of the predicted trajectory with the relief.

The invention is described below with reference, inter alia, to a prior art described in the Applicant's patents or patent applications cited below and pertaining to results of work conducted in the fields of flight management (including products of FMS type), monitoring (including products of TAWS, WXR and ISS type) and databases, and covering the topics hereinafter:

Methods of formulating the zones that it is possible to reach according to a given vertical flight profile and their representation on the navigation screen, Methods of formulating the mapping of the lateral margins in relation to the surrounding reliefs and their representation on the navigation screen, Methods of formulating a trajectory allowing the flight and circumventing a set of non-usable (prohibited or dangerous) geographical zones and the associated flight plan within the sense of the "legs" defined in the ARINC-424 standardization—for systems of FMS type, FMS lateral and vertical trajectory formulation methods complying with criteria for avoiding meteorological vagaries, Automatic flight re-scheduling methods due to security problems (illegal pilot at the controls, dead pilots, etc.), Methods for calculating FMS optional routes in a "What if" context The Applicant's patents or patent applications mentioned above are the following:

(1) FR 2 749 686 or U.S. Pat. No. 6,097,996 (Deker): it describes a lateral "Flight planner", which is a method making it possible to avoid airplanes that are moving.

(2) FR 2 749 675 or U.S. Pat. No. 6,161,063 (Deker): it describes a vertical "Flight planner", which is a method making it possible to avoid risk zones.

(3) FR 2 752 934 or U.S. Pat. No. 6,181,987 (Deker/Bomans): it describes a system proposing a flight plan strategy to the pilot during a change of said strategy.

(4) French patent application 06 01204 (Coulmeau): "Procédé de vol autonome" ["*Autonomous flight method*"]. This patent application describes a system proposing a re-scheduling of the flight, negotiated or not with the authorities should the crew be unavailable.

(5) French patent application 05 12423 (Coulmeau): "Dispositif et procédé de construction automatisée de trajectoire d'urgence pour aéronefs" ["*Device and method of automated construction of an emergency trajectory for aircraft*"]. This patent application describes a system proposing calculation of a flight plan for exiting the active flight plan in the event of an emergency and which is compatible with international procedures.

(6) French Patents 2 860 292, 2 861 478, 2 867 851, 2 867 270 (Marty/Bitar). These patents describe the following inventions:

Methods of mapping the approximate curvilinear distance necessary to attain each of the space points surrounding an origin position while circumventing the reliefs and obstacles encountered according to a given vertical profile, A method of detecting the relief zones that turn out to be uncrossable as a function of the expected vertical flight profile of the aircraft.

(7) Patent application FR 05.10515 and patent FR 2 864 312 (Marty/Bitar): "Procédé d'aide à la navigation pour aéronef en situation d'urgence" ["*Method of aiding navigation for aircraft in an emergency situation*"]. These patents describe:

Methods of mapping the lateral distance to the surrounding reliefs,

The determination of the zones that it is possible to reach for an aircraft according to a given vertical flight profile, in particular upon engine failure or depressurization, The consideration of lateral margins imposed by civil aeronautical procedures, The graphical representation of the zones that it is possible to reach so as to aid the crew to determine the destination point for the aircraft.

(8) Patent application FR 05.12420 (Marty/Bitar/Francois): "Procédé de détermination du profil horizontal d'un plan de vol respectant un profil de vol vertical imposé" ["*Method of determining the horizontal profile of a flight plan complying with an imposed vertical flight profile*"]. This patent describes in particular:

The determination of a trajectory complying with constraints of minimum curvature making it possible to attain two points in space according to an imposed vertical flight profile while circumventing the surrounding obstacles and reliefs, The consideration of zones that are regulated by air navigation and are independent of the aircraft's intrinsic flight dynamics capabilities, The consideration of lateral margins with respect to the surrounding regulated zones and reliefs, A method of describing the trajectory according to a flight plan (sequence of "legs" TF "fly-by" according to the definitions of the ARINC-424.17 standard) based on points referenced by their geographical coordinates and not of "Fix" type.

The objective of the present invention is to help the crew in the formulation of a route that makes it possible to solve an aircraft flight incident, in particular a flight making it necessary to approach the relief. Consequently, seen from the other equipment of the aircraft, the invention behaves as a function allowing the introduction and activation of a substitute flight plan relating to this incident.

The present description therefore considers that all the mechanisms and data and information exchanges carried out during the formulation of a flight plan pre-exist. In particular, neither the descriptions of the exchanges between the FMS and the FMD ("Flight Management Display"), nor the displays proposed on the CDS ("Control and Display System"), will be repeated.

Likewise, the present description does not propose any innovation as regards the ability of existing systems to receive via the "Datalink" (digital radio link) flight plans proposed by the operating company. Any step of the process described hereinafter can be interrupted at any moment so as to activate a currently existing procedure, such as in particular the activation of an AOC flight plan (relating to the preferences of the company operating the aircraft, simply called the "company" subsequently).

The description below presupposes the existence of ground/onboard systems able to provide the crew with a description of meteorological zones of various types and active navigation zones in digital form. Nevertheless, these data remain optional: in their absence, the only restriction on the flight plan formulated is that it possibly does not circumvent these zones.

Figure 2:
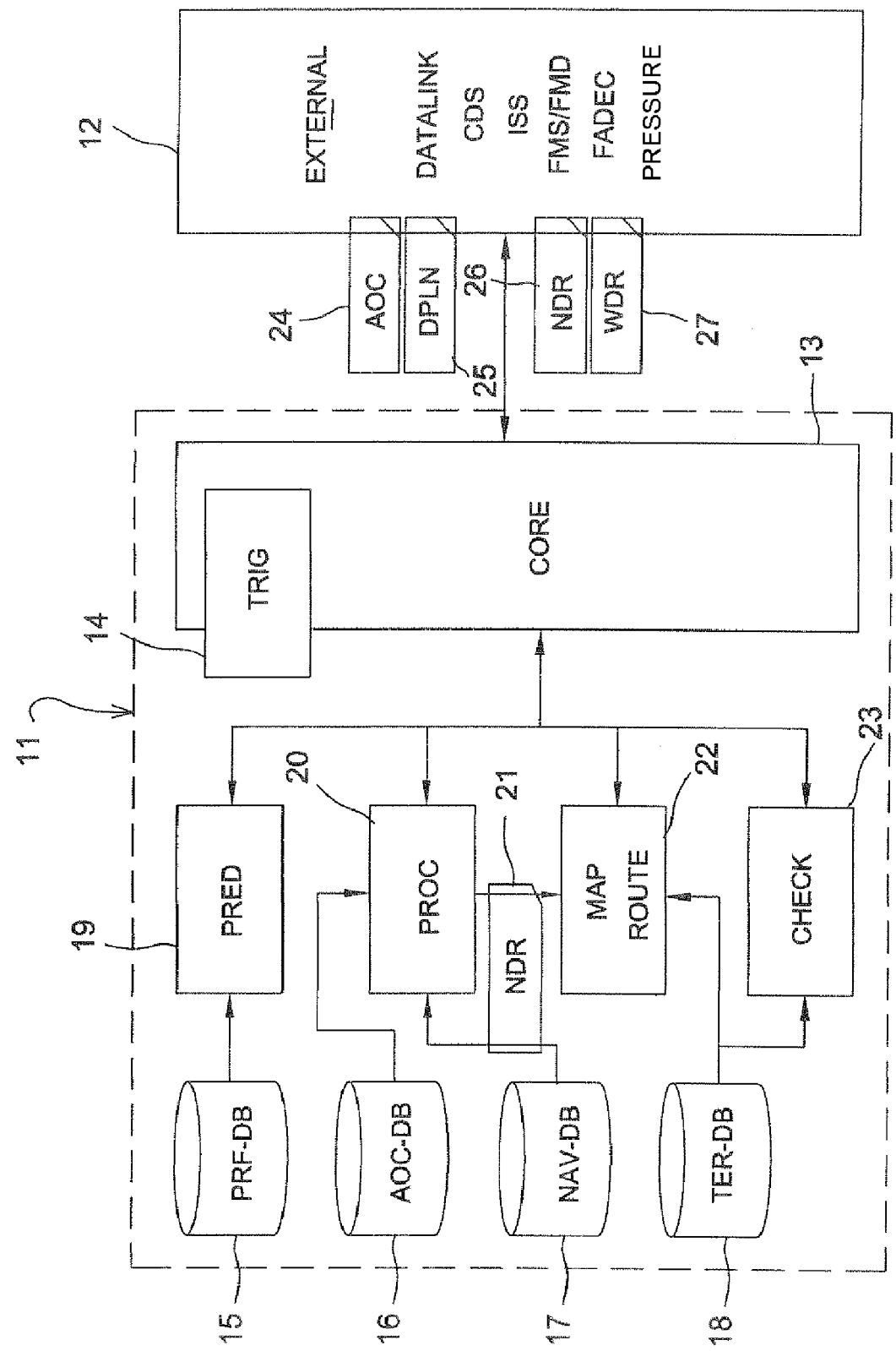
FIG. 2 is a simplified block diagram of an exemplary device for implementing the present invention.

Represented in FIG. 2 is the functional architecture 11 of an exemplary implementation of the method of the invention. The elements of the functional set 11 are linked with the various respective elements of a set 12 of elements outside the set 11, subsequently called "EXTERNAL". In the example represented in the drawing, the elements that the set 12 comprises are: the "Datalink" link, the CDS, the ISS, the FMS and the FMD, the FADEC ("Full Authority Digital Engine Computer", that is to say the computer controlling the engines of the aircraft), and the sensors for measuring the aircraft's internal pressure, imposed by the pressurization system.

The set 11 comprises the following elements whose operation is described below:

an "interactive calculation core" ("CORE") 13 associated with a calculation function 14 ("TRIG") and communicating on the one hand with the elements of the set 12, and on the other hand with the other elements 15 to 23, described below, of the set 11, a performance database 15 of the aircraft (PRF-DB), an optional database 16 of the company's preferences (AOC-DB), a database 17 of navigation data (NAV-DB), a terrain database 18 (TER-DB), a function 19 for utilizing the parameters of the aircraft and of the performance model of this aircraft (PRED), a function 20 for drawing up the list of the possible procedures to be achieved (PROC), an optional memory 21 for navigation data (NDR, i.e. "Navigation Data Report"), a function 22 for drawing up the mapping of the zones that can be reached by the aircraft (MAP) and for determining the path required (ROUTE), an optional trajectory checking function 23.

Moreover, the set 12 receives and processes the following data:

optionally, the preferences 24 of the company (AOC), communicated via the Datalink, the descent flight plan data 25 (DPLN), optionally, navigation data 26 (NDR), which can be displayed for the crew on appropriate viewing devices, meteorological data 27 (WDR).

In detail, the data received by the various elements of the sets 11 and 12 are the following:

DPLN ("Descent PlaN") 25: represents the substitute descent flight plan formulated in accordance with the invention, WDR ("Weather Data Report") 27: represents the meteorological data consolidated by the systems aboard such as the ISS or on the ground at the control bodies via the VHF or data communications, NDR ("Navigation Data Report") 21 and 26: represents the data on the active aeronautical zones extracted from the navigation database or via the VHF or data communications and displayed on the viewing devices consulted by the crew.

The databases cited above are organized in the following manner:

TER-DB 18: terrain model similar to that of an ISS/TAWS, but its resolution is coarser since it is specifically suited to the safety margins of the descent flight plan formulated, so as to reduce the size necessary for its storage and for its use.

NAV-DB 17: navigation database, which can be that used by the FMS or very similar to it.

PRF-DB 15: performance model, which can advantageously be that used by the FMS or very similar to it.

AOC-DB 16: database of preference parameters of the company used for selecting the airports that have, for example, the appropriate maintenance means.

The elements of the set 11 fulfil the following functions:

TRIG 14: it evaluates the operational situation requiring an adaptation of the flight plan of the aircraft. On the basis of the following input data: the aircraft pressurization conditions, the requests of the crew, the conditions of the engines, it formulates the operational situation.

PRED 19: it establishes, on the basis of the altitude of the aircraft, the atmospheric conditions and the performance model, the following data: the vertical descent and holding profile, the speed profile along the descent profile, the flight time and times of transit through the points, and the consumption predictions.

MAP 22: it establishes the mapping of the zones that it is possible to reach from the vertical profile defined by PRED, the terrain model of TER-DB, the meteorological constraints, the navigation constraints, and the 3D position of the aircraft.

ROUTE 22: it determines on the basis of the mapping of the zones that it is possible to reach the path required to reach the destination selected by the crew, that is to say the trajectory circumventing the relief and the corresponding section of the flight plan (in the form of a sequence of legs TF "fly by" or "fly over").

PROC 20: it establishes the sorted list, according to various pre-established criteria (since if the pilot is not happy with the order, he always has the possibility of not choosing the first option of the list), of the procedures (published or formulated by the crew), that it is possible for the aircraft to achieve on the basis of the following data: the operational situation defined by TRIG, the list of the priorities of the procedures (according to the situation envisaged) and the procedures compatible with the map MAP.

CHECK 23: it checks the interferences of the trajectory calculated by the FMS on the basis of the trajectory predicted by segments and arcs and the terrain database via TER-DB.

The interactive core 13 (CORE) carries out the following operations (according to the functional complexity chosen and set forth below):

(1) The detection of the emergency situation (that can be automatic, for example in the event of engine failure, or manual by pilot decision),
(2) The activation of the calculation functions,
(3) The transmission to the company, via the Datalink, of the descent trajectory and of the procedures that the aircraft can implement, so as to allow the company to transmit its preferences or to propose a clearance route in return,
(4) The request to update the meteorological and zone activation information, via the Datalink or the VHF,
(5) The interactivity with the crew with a view to activating the formulated route.

Figure 3:
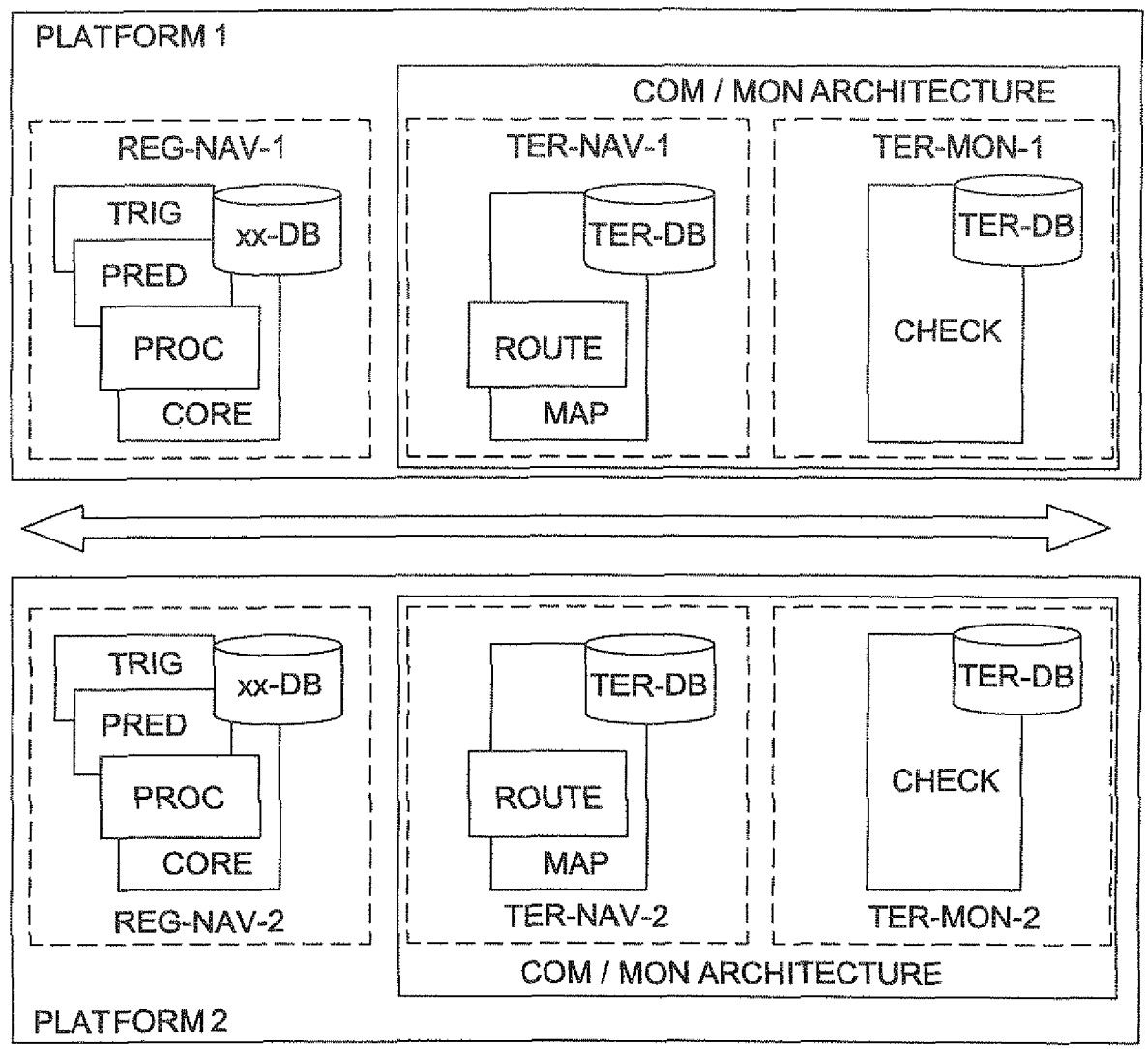
FIG. 3 is a simplified block diagram of an exemplary layout in the computers of an aircraft of the device of FIG. 2, FIGS. 4A to 4D are examples of TAWS screen views without and with the implementation of the method of the invention.

Represented in FIG. 3 is an exemplary split of the functions cited above as follows:

Partition REG_NAV: this is responsible for the functions related to flight management and the ordering of the device of the invention, such as in particular the processing operations related to the core of a system of FMS type and to its external interfaces with the CDS and the datalink. The functions of the invention included in this partition are CORE, TRIG, PROC, PRED.

Partition TER_NAV: this is responsible for the functions related to the presentation of the zones that it is possible to reach and to the establishment of the circumvention route complying with the lateral margins with the surrounding terrain. The functions of the invention included in this partition are MAP and ROUTE.

Partition TER_MON: this is responsible for checking the route ultimately formulated by the FMS in relation to the surrounding relief. The function included in this partition is CHECK.

The device of the invention can easily be implemented in a conventional architecture of aeronautical computers. Specifically, the segregation of the functions TER_NAV and TER_MON allows the implicit realization of an avionic architecture of COM/MON type by guaranteeing that the algorithmic principles of MAP/ROUTE and of CHECK are different and that moreover, the two functions are carried out by disjoint aeronautical applications possibly of different criticality level.

Additionally, the systems envisaged (of FMS or ISS type) are provided for dual operational. This dissymmetric duplication of the platforms carrying the calculation devices comes as an adjunct to the COM/MON realization of the function for circumventing the relief and makes it possible to reach the criticality level required for such functions, according to the functional complexity adopted.

The functional complexity according to the invention is advantageously available according to five realization levels. For each, an exemplary split between the FMS and ISS/TAWS systems is presented hereinafter.

Level 1: "Awareness Only" (simple presentation of an incident)
The functions accessible at this level are limited to the evaluation and to the presentation to the crew of the zones that it is possible to reach, through the functions PRED and MAP,
The crew is responsible for determining the accessible procedures, manual establishment of the flight plan, in particular the choice of the homing point, its checking and its activation.

Level 2: "Emergency Flight Plane Checker"
The system proposes a sorted list of the accessible procedures. The accessibility of the procedures proposed to the crew is not verified a priori by PROC,
The crew is responsible for selecting a procedure, establishing the flight plan and requesting checking of the chosen procedure,
The system carries out, on request, a check of the flight plan to detect the interferences with the relief via the function CHECK,
The crew is responsible for activating the flight plan, after checking.

Level 3: "Assisted Emergency Flight Checker"
The system proposes a presentation of the zones that it is possible to reach and a sorted list of the procedures that the aircraft can implement via the functions PRED, MAP and PROC,
The crew is responsible for interactively selecting a procedure, establishing the flight plan and requesting checking of the chosen procedure,
The system carries out, on request, a check of the flight plan to detect the interferences with the relief via the function CHECK,
The crew is responsible for activating the flight plan, after checking Level 4: "Assisted Emergency Flight Planner"
The system proposes a presentation of the zones that it is possible to reach and a sorted list of the procedures that the aircraft can implement, via the functions PRED, MAP and PROC,
The crew is responsible for interactively selecting a procedure, The system carries out a construction of the complete flight plan via ROUTE, triggers the predictions, checks the interferences and activates the selected flight plan.

Level 5: "Fully Automatic Emergency Flight Planner".

If it is impossible for the crew to select a procedure (subsequent to abrupt depressurization, for example), the system automatically carries out a construction of the complete flight plan via ROUTE, triggers the predictions, checks the interferences and activates the selected flight plan. This level is triggered automatically after a time span parametrized by configuration, after the system proposes to the pilot a sorted list of acheivable procedures and if, during this time span, the system has not identified an action of the pilot to select an element of the list ("ACTIVATE") or to abandon the automatic procedure in progress ("CANCEL").

The various functions of the invention can be split over various types of home platforms, including the systems of FMS and ISS/TAWS type cited in the preamble. Depending on the resources available and the existing exterior systems, the realization can vary in terms of functions developed or for assigning the calculation resources. By assumption, for the descriptions below:

The ISS and FMS systems are interconnected via standard protocols and means.

The flight plan formulated with the aid of the system of the invention is of "Emergency flight plan" type supplementing the current plans: active, secondary, temporary.

The selection by the crew of the "emergency flight plan" implicitly triggers all the usual processing operations applied to the existing flight plans (predictions, display, etc.).

The table below summarizes possible examples of splitting the functions between the platforms realizable by extending the existing systems as a function of the functional complexity levels adopted.

In this table, rows 1 to 4 pertain to the functional complexity levels defined above, and the variants A and B of each level correspond respectively to the most conventional variant, and to a less conventional variant. The level 5 options are identical to level 4. Only the automation of the selecting of the procedure to be engaged differentiates them.

The methods implemented by the functions MAP and ROUTE are described in the patents or patent applications cited above under (6), (7) and (8) and are based on the following data:

A vertical flight profile which is dependent on the speed and descent capabilities of the aircraft. It is evaluated by the FMS if this system is available or based on a simplified model otherwise. For example, a descent profile at constant vertical speed or slope, parametrizable in the default configuration as a function of the type of aircraft on which the device is installed. The chosen model must be conservative in terms of safety in relation to the relief, that is to say it must correspond to a faster descent profile than the one that the airplane will be able to carry out. Thus, the solution is not optimal, but it remains secure. The only means of rendering it secure and optimized is to use a complete performance model.

A profile of safety margins that are required with a view to moving laterally away from the circumvented reliefs, and which is dependent:
on the turning capabilities of the aircraft according to flat turning assumptions,
on the emergency descent procedures involving compliance with margins defined according to the space used.

A departure position, which is that of the aircraft or a short-term extrapolation imposed by the procedures. For example, the position considered can be approximated by the aircraft's position shifted by a minute of flight on a heading at 45° to its initial route.

An arrival position imposed by the procedure selected and the destination envisaged, A description of the zones to be circumvented as an adjunct to the relief, for example:
The meteorological zones input by the crew by means of a dedicated interface or provided by the "Weather Data Consolidation" function in charge of merging the data of the radar with the meteorological information services,
The active aeronautical zones (such as those defined by the OACI codes: R, D, P) extracted from the navigation base or the air traffic control information.

A terrain database specifically suited to the invention, so as to guarantee a dissymmetry with the terrain base of the TAWS and that used by the function CHECK. The size

|    | PRED Descent profile | MAP/ROUTE Zones that can be reached | CHECK Checking of the flight plan | PROC Procedures that can be implemented | Interactive creation of the flight plan | Automatic proposal of the flight plan |
|----|------|----------|----------|------|------|------|
| 1A | FMS  | ISS/TAWS | N/A      | N/A  | N/A  | N/A  |
| 1B | FMS  | FMS      | N/A      | N/A  | N/A  | N/A  |
| 2A | N/A  | N/A      | FMS      | FMS  | FMS  | N/A  |
| 2B | N/A  | N/A      | ISS/TAWS | FMS  | FMS  | N/A  |
| 3A | FMS  | ISS/TAWS | ISS/TAWS | FMS  | FMS  | N/A  |
| 3B | FMS  | FMS      | FMS      | FMS  | FMS  | N/A  |
| 4A | FMS  | ISS/TAWS | ISS/TAWS | FMS  | FMS  | FMS  |
| 4B | FMS  | FMS      | FMS      | FMS  | FMS  | FMS  |
| 5A | FMS  | ISS/TAWS | ISS/TAWS | FMS  | FMS  | FMS  |
| 5B | FMS  | FMS      | FMS      | FMS  | FMS  | FMS  | obtained with the criteria below is less than 4 Mbytes for worldwide coverage. Its characteristics are, for example, the following:

- An angular resolution of 1 arc minute on longitudes and latitudes,
- An encoding of the maximum altitude value on each cell in hundreds of feet,
- A structure with geographical zones with different resolutions, respectively for representing the zones not requiring any detailed mapping, such as oceans or deserts without reliefs, and for the zones that have to be detailed, in particular mountainous zones.

Figure 4A:
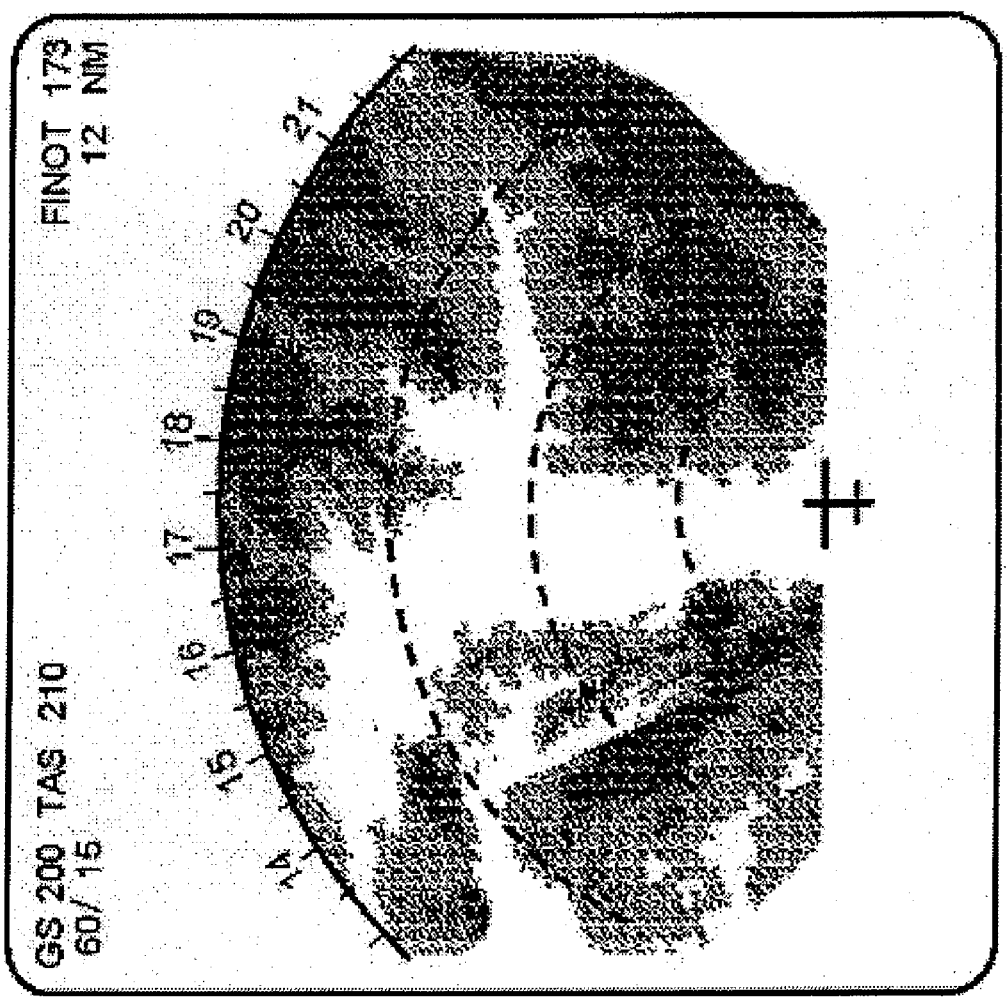
Figure 4B:
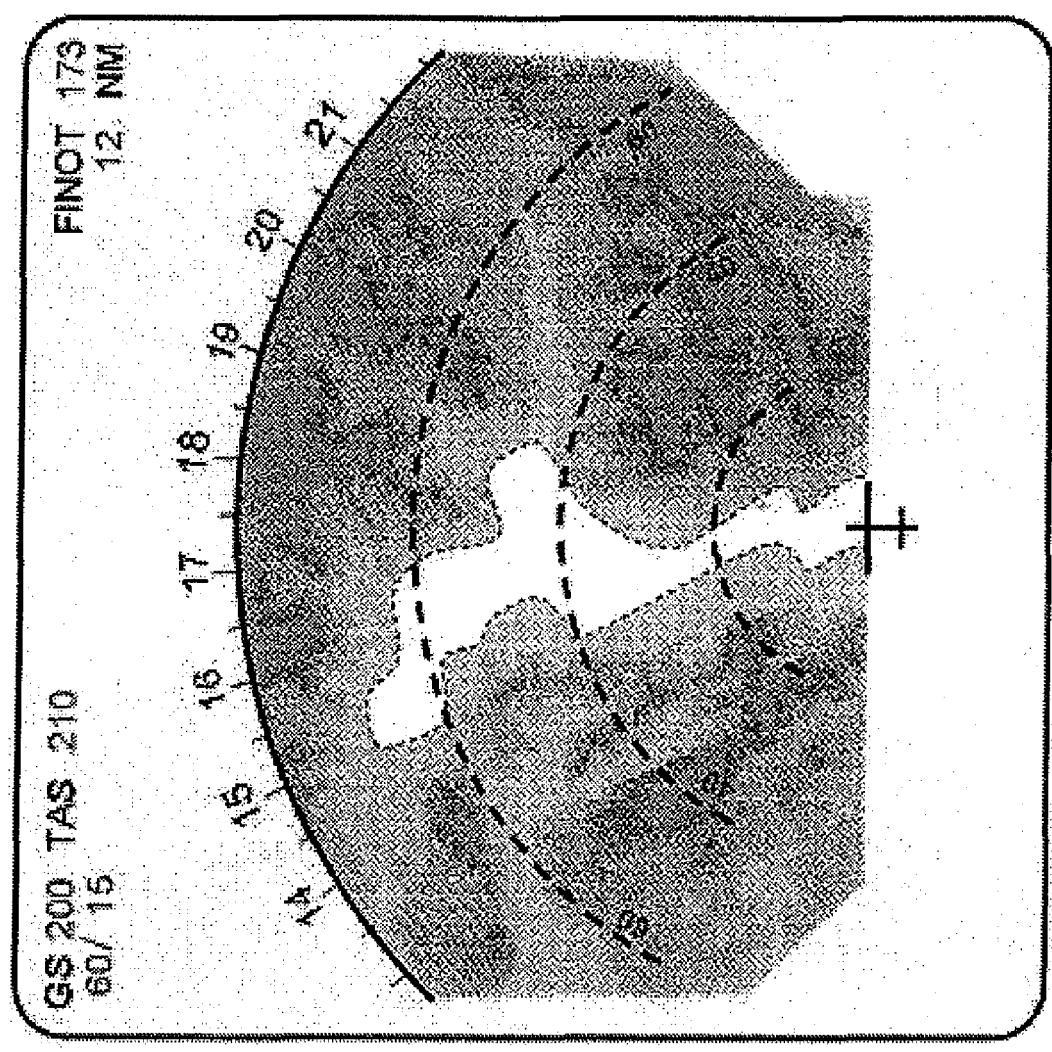

The MAP calculation steps borrow the teachings of the patents or patent applications cited above under (6) and (7) and carry out the following operations:

- Mapping of the uncrossable zones, which is obtained on the basis of the vertical descent profile of the aircraft provided by ROUTE and of the lateral safety margins related to the procedures used.
- Representation to the crew of the zones that can be reached by the aircraft and that comply at one and the same time with the vertical and lateral margins with respect to the relief. Represented respectively in FIGS. 4A and 4B are an exemplary conventional TAWS display and an example of that in accordance with the invention. In the latter case, the geographical zones that can be reached by the aircraft are clearly delimited on the viewing screen, in the present case, by a closed dashed curve outside which the non-usable zones are "dimmed", while the zones that can be reached, inside this curve, are not dimmed.

The ROUTE calculation steps borrow in particular the teachings of the patents or patent applications cited above under (6) and (8) and carry out the following operations:

- Extraction of the envelope of the shortest flyable trajectories to reach the aim point.
- Approximation of a trajectory contained in the envelope by a series of segments and circular arcs whose curvatures are compatible with the speed profile imposed by the function PRED.
- Description of the flight plan section as a sequence of "legs" TF (great circle between two fixed points) of the ARINC-424 standard.

Figure 4C:
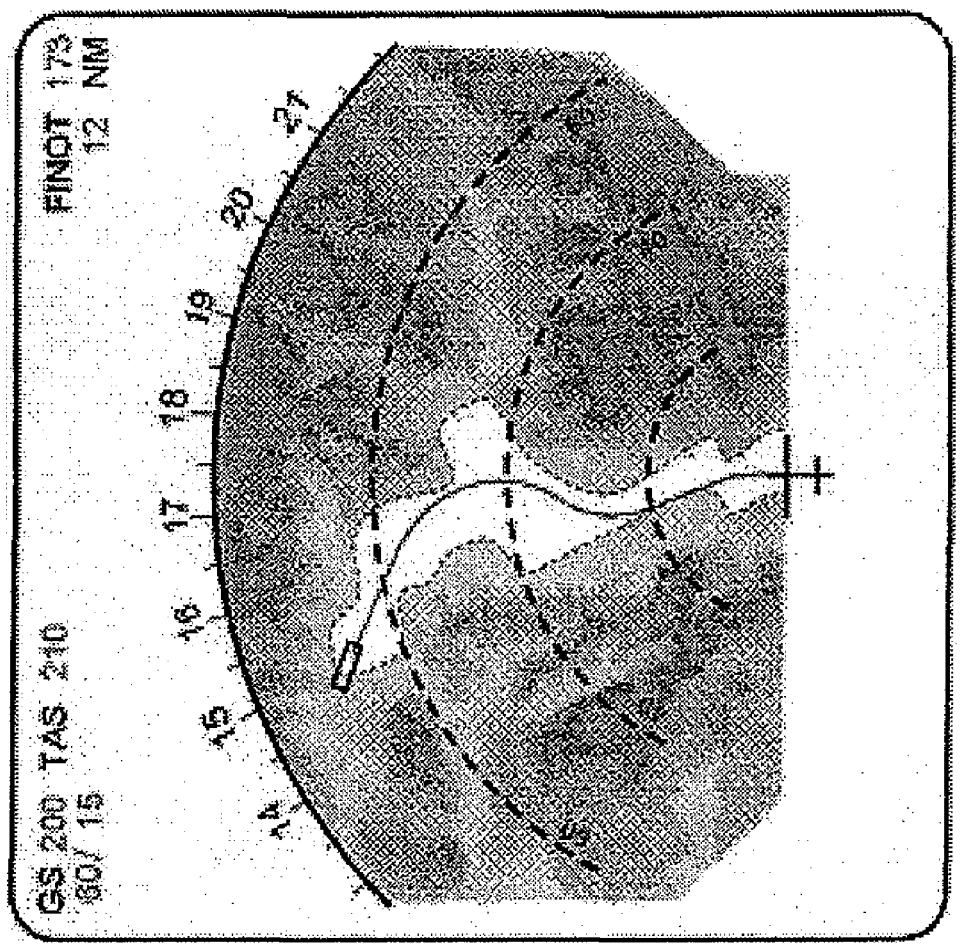
Figure 4D:
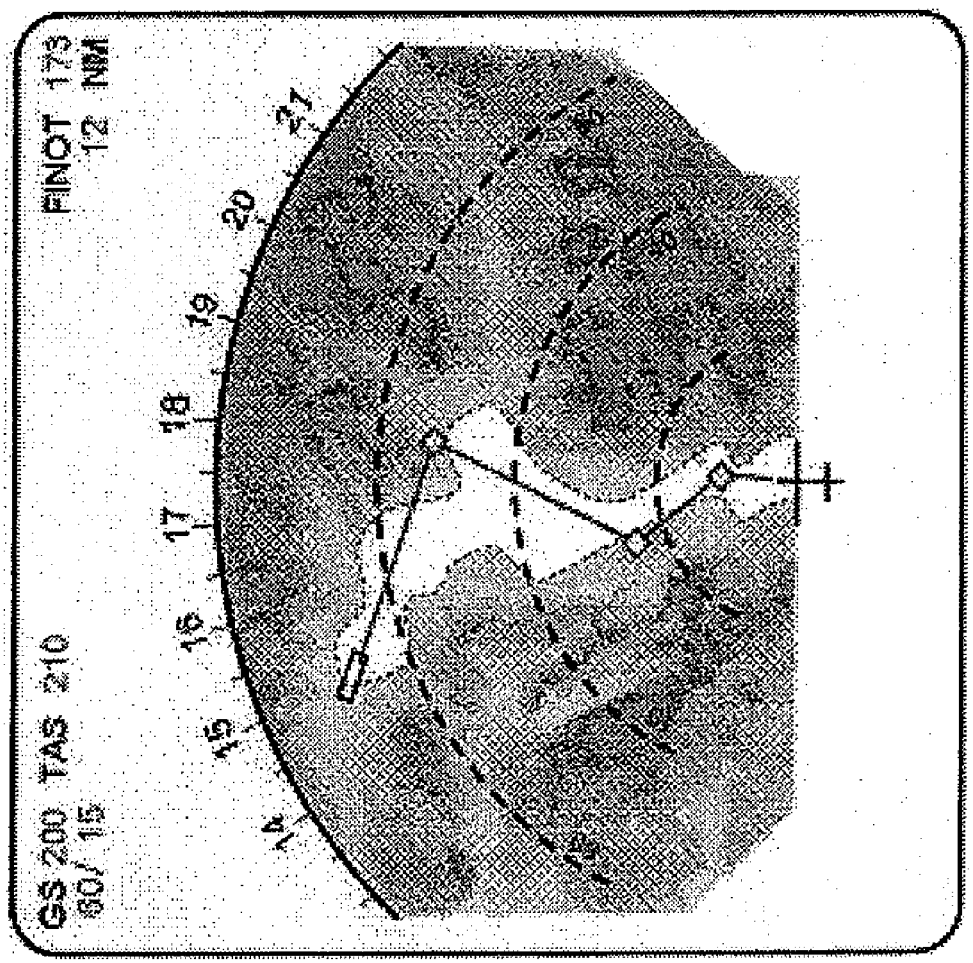

Represented in FIGS. 4C and 4D are screen views similar to that of FIG. 4B, with the addition of either a representation of the trajectory such as calculated by the function ROUTE (FIG. 4C), or a representation of a section of the flight plan (FIG. 4D) arising in the form of a series of "legs".

The objective of the method implemented by the function TRIG is to detect the operational situation requiring the use of the invention.

The operational situations that can be taken into account by the method of the invention (or a combination of these situations) are for example:

- Depressurization,
- Bomb alert,
- Medical emergency on board,
- Icing conditions,
- Meteorological phenomenon to be circumvented in the case of an emergency diversion (laterally or vertically),
- Malfunction of the systems requiring fast landing,
- Partial or total loss of propulsion, etc.

The objective of the function PROC is to establish a sorted list of accessible procedures by executing the following points:

- Identifying in the FMS navigation database reference points and points in space on the basis of which procedures are instigated, points situated in proximity to the aircraft or a point designated interactively by the crew as being the best option to be taken a priori to rapidly place the aircraft in a secure situation.
- Sorting the procedures according to a list of criteria that can be parametrized as a function of the version of the equipment, of the carrier, of the company, or of the emergency procedure to be managed ("power dive", "drift down" or "power off").

The proximity, in relation to the aircraft, of the reference points and of the points in space for instigating the procedures is evaluated with respect to a threshold distance D that can be configured according to the carrier, the company or the software version used.

The objective of identifying the near elements in the navigation database is to list the set of published points that it would seem to be opportune to attain to make the aircraft safe. Once the reference point has been reached, at an altitude compatible with the problem encountered by the aircraft, the function carried out assumes a nominal slaving to the published procedure until the problem is resolved or the instructions from air traffic control are implemented.

The elements searched for in the navigation database in the ARINC-424 format are the following:

- Section ER/R/RA ("Airways" and "CoRoutes") to attain a lower flight level compatible with an existing procedure or those preferred by the company,
- Section EA ("Waypoint") to attain a lower flight level at a point situated downstream of the flight plan, chosen by the pilot or determined by the algorithm as being the first point "clear of the relief",
- Section EP ("Holding Patterns") to attain a near standby zone and engage a spiral descent, at least down to the published minimum altitude,
- Section PE ("Standard Terminal Arrival Routes") to attain one of the departure points of a published approach procedure that is secure in relation to the relief,
- Section PF ("Approaches") to attain an approach axis as a matter of urgency and to touch the aircraft down in the shortest timescale.

The criteria to be taken into account to establish the relevance level of each of the procedures identified are in particular:

- Distance: it must be compatible with the quantity of fuel remaining or, if the consumption predictions are not available, the procedures are ranked in order of increasing distance.
- Airport:
    - Country code permitted (by the company),
    - Permitted type (military, civil, etc.),
    - Recommended by the company,
    - Availability of STAR/APPR to simplify the establishment of the flight plan up to touchdown and MA/GA "Missed Approach/Go Around",
    - Availability of STAR leading to two opposite QFUs (direction of runway in service) (to avoid precluding any possibility of approach according to the changes of local wind).
- Procedure:
    - Type of procedure (from among those listed above for the function PROC) and, according to the operational context, derived from the database or formulated on board,
    - Number of possible transitions to STAR/APPR to increase the subsequent possibilities of reconfiguration according to the instructions from air traffic control or the tower,
    - Compatible runway length, Duration of the procedures (homing of the point then STAR/APPR) to limit the time of exposure to the emergency situation, Complete inclusion of the procedure at the zones that it is possible for the aircraft to reach, Aircraft landing capability and suitable landing means available.

The methods implemented by the function PRED are those that are well known to the person skilled in the art specializing in FMS ("Flight Management System"). The only specialization envisaged by the invention consists in fixing the input constraints of existing calculation procedures so as to formulate the (vertical and speed) profiles for the situation considered.

The objective of the method implemented by the function CORE is to order the processing operations to be split between the systems as a function of the split and of the functional complexity level adopted.

Described below, with reference to FIGS. 5 to 8, is a preferred example of the implementation of the method of the invention by CORE for the first four preferential levels of functional complexity of the invention, the fifth, corresponding to "fully automatic". Of course, the number of levels of functional complexity may be different from that adopted here.

Figure 5:
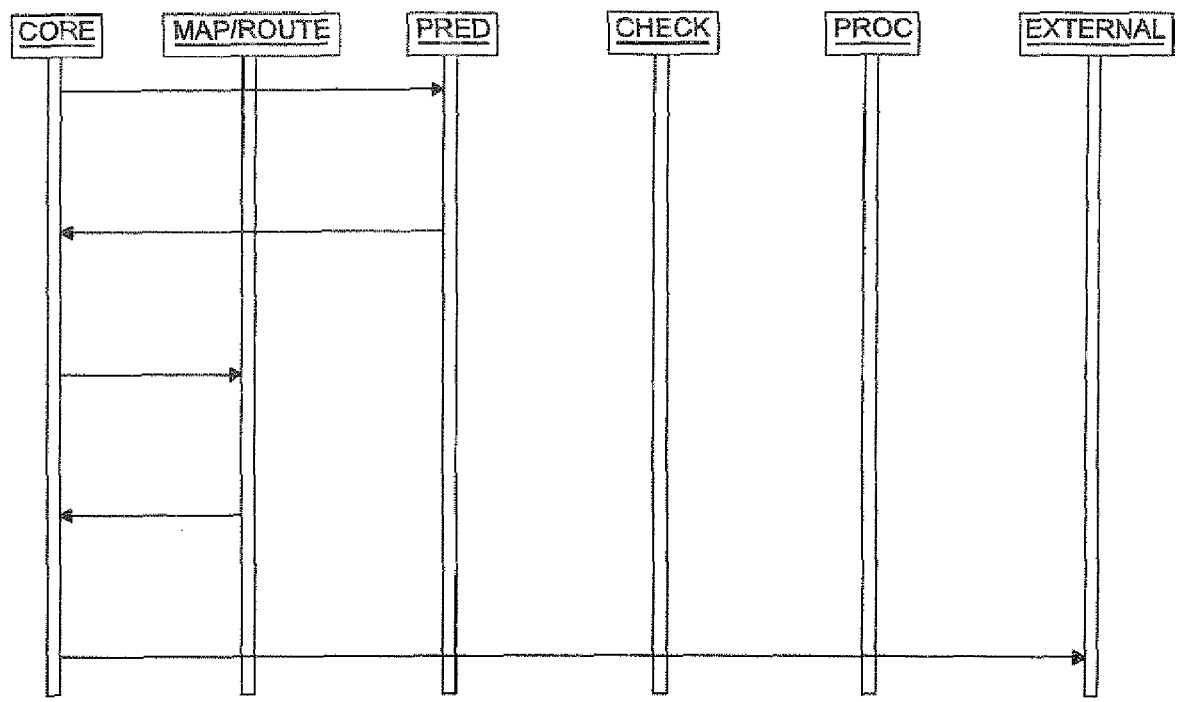
FIGS. 5 to 8 are simplified timecharts showing the successive steps of the implementation of the method of the invention for various levels of functional complexity.

Level 1:

This level is schematically illustrated in FIG. 5. This figure, like FIGS. 6 to 8, sets forth, from top to bottom, the successive steps of the implementation of the corresponding function. Thus, the five main steps of the implementation of the function CORE are, in chronological order:

CORE tells PRED to send it, on the basis of the parameters of the aircraft and its performance model, evaluations relating to the descent profile, to the flight time and to the fuel consumption, the function PRED sends it the requested information, the function CORE sends the functions MAP and ROUTE the evaluations relating to the descent profile, the functions MAP and ROUTE send back to CORE the zones that the aircraft can reach having regard to the said evaluations, CORE makes the viewing devices of the set 12 display the zones that the aircraft can reach.

Figure 6:
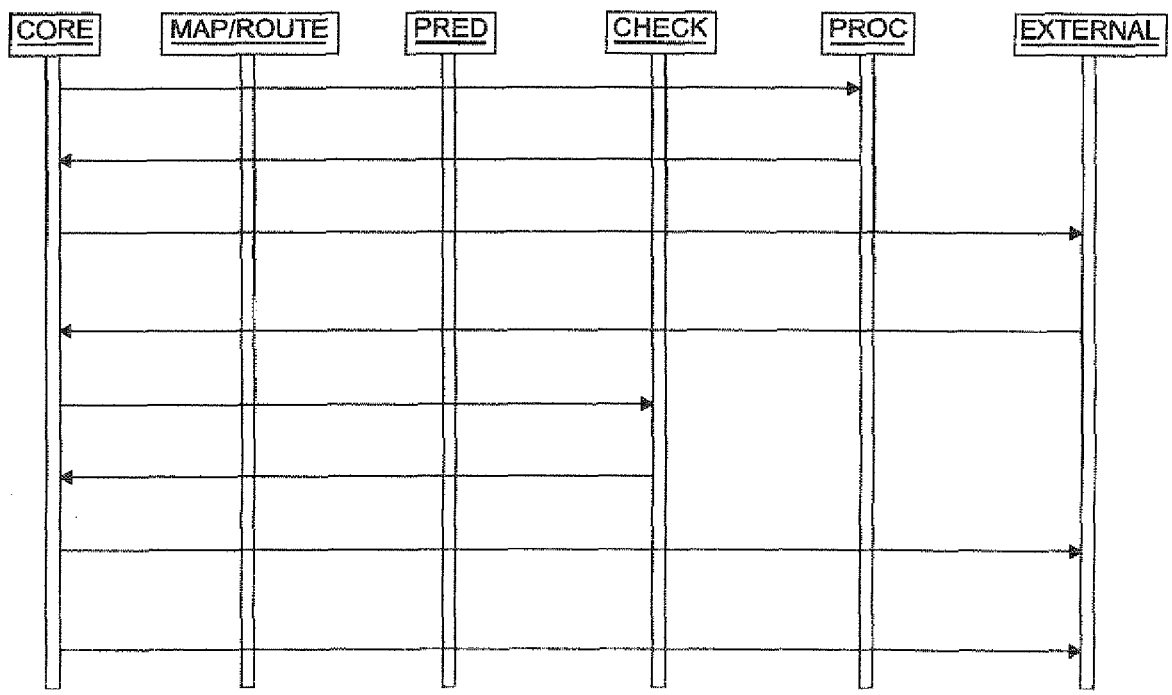

Level 2:

This level, illustrated in FIG. 6, comprises, in order, the following eight main steps:

CORE asks PROC to evaluate the position (or the situation) of the aircraft and the surrounding conditions, PROC sends it a summary of the various procedures that relate to this position and can be followed from this position, CORE has these various procedures displayed on the FMD of EXTERNAL, the crew selects, by virtue of the man-machine interface of the FMD, the procedure that they judge the most appropriate, and this information is sent by the FMD to CORE, CORE asks CHECK to evaluate the relevance of the procedure thus chosen, CHECK answers CORE so as to signal to it any interferences between the chosen procedure and the situation, in particular as a function of the relief of the surrounding terrain, if such interferences exist, CORE has them displayed on the FMD, and in this case (not represented in the figure), the crew chooses another procedure, and the two previous steps are repeated, when a procedure is recognized as relevant by CHECK, CORE transfers it to the FMS for utilization by the FPLN.

Figure 7:
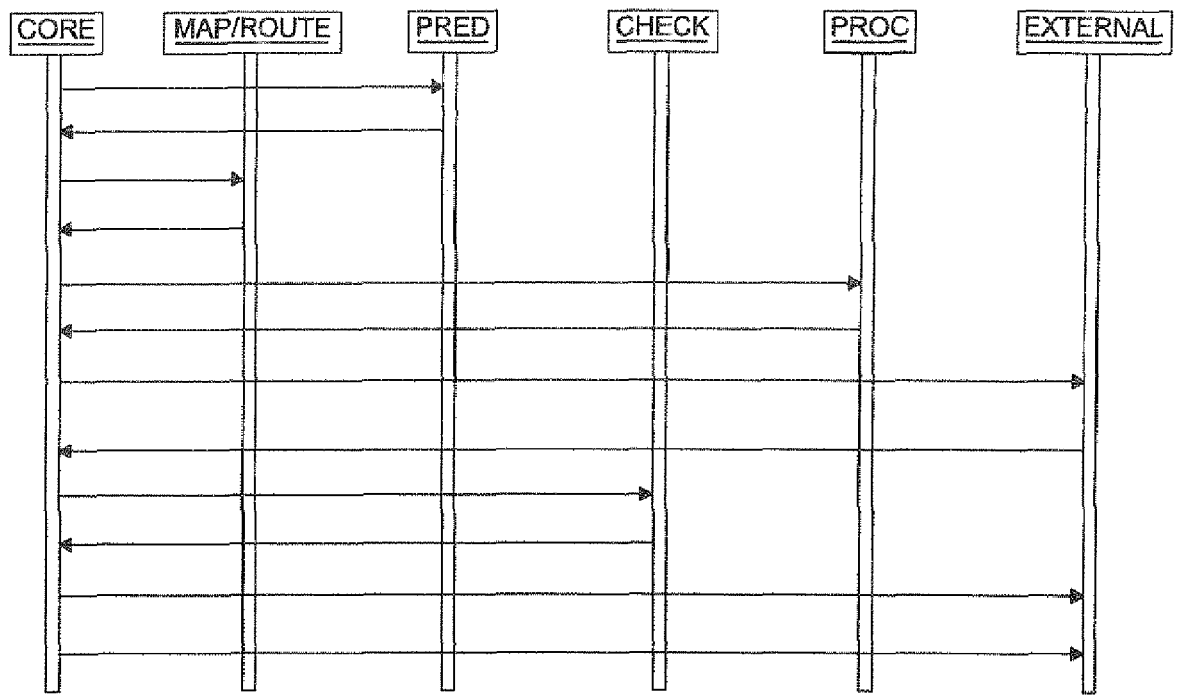

Level 3:

This level is illustrated in FIG. 7 and comprises the following twelve main steps:

CORE asks PRED to send it, on the basis of the parameters of the aircraft and its performance model, evaluations relating to the descent profile, to the flight time and to the fuel consumption, the function PRED sends it the requested information, CORE transmits this information to MAP/ROUTE, MAP/ROUTE sends CORE the mapping of the zones that the aircraft can reach and the corresponding path, CORE asks PROC to send it, as a function of the information received from MAP/ROUTE, the summarized list of corresponding procedures, PROC sends CORE the summarized list of these procedures, CORE has the FMD display these procedures, the crew selects one of these procedures with the aid of the man-machine interface of the FMD, CORE asks CHECK to evaluate the relevance of the procedure thus chosen, CHECK answers CORE so as to signal to it any interferences between the chosen procedure and the situation, in particular as a function of the relief of the surrounding terrain, and, of course, if such interferences exist, CORE displays them on the FMD, and in this case (not represented in the figure), the crew chooses another procedure, and these last two steps are repeated, when a procedure is recognized as relevant by CHECK, CORE transfers it to the FMS for utilization by the FPLN.

Figure 8:
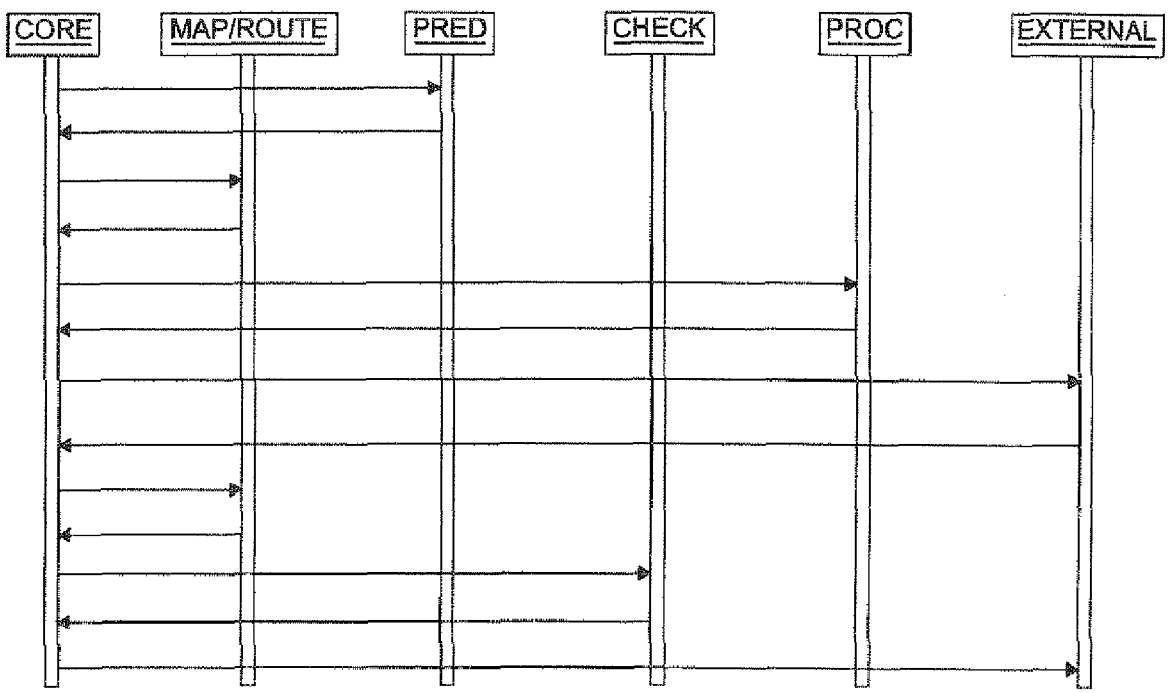

Level 4:

This level is illustrated in FIG. 8 and comprises the following thirteen main steps:

The first eight steps are the same as those of level 3, thereafter:

CORE sends MAP/ROUTES the information relating to the procedure chosen by the crew, MAP/ROUTE sends CORE the corresponding emergency flight plan, CORE asks CHECK to validate this emergency flight plan, CHECK answers CORE so as to signal to it any interferences between the chosen procedure and the situation, in particular as a function of the relief of the surrounding terrain, and, of course, if such interferences exist, CORE displays them on the FMD, and in this case (not represented in the figure), the crew chooses another procedure, and these last two steps are repeated, when a procedure is recognized as relevant by CHECK, CORE transmits the emergency flight plan thus validated to the FMS.

Level 5:

The only difference with respect to level 4 is that the selecting of a procedure by the crew is deleted and that CORE chooses the "least bad" and has it validated by CHECK.

The objective of the method implemented by the function CHECK is to verify the interferences of the trajectory established by the FMS with the digital terrain model.

Figure 9:
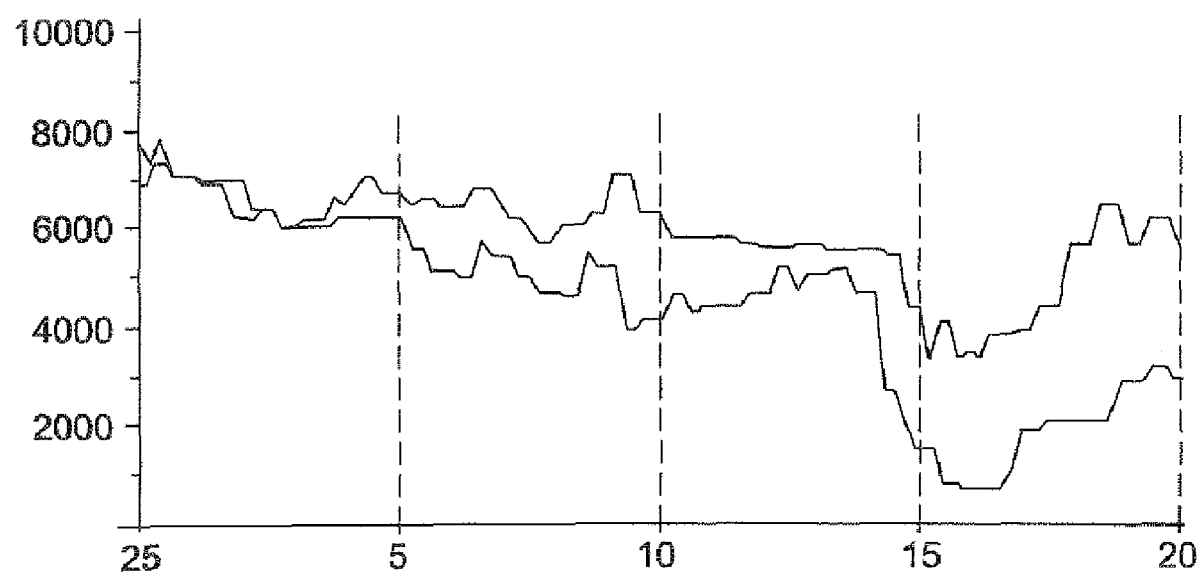
FIG. 9 is an exemplary terrain profile under an emergency descent trajectory such as formulated according to the method of the invention.

The computer, having access to the digital terrain model, evaluates the profile of the relief for each point of the trajectory. The terrain model elevation value adopted is defined by:
- The fixed sampling interval while traversing the lateral trajectory. It is defined by the resolution of the terrain mesh cell and predictions of the FMS,
- The width of the strip of terrain centred on the sampling position which is fixed by the accuracy of the terrain mesh cell and by the navigation and procedural constraints, such as for example the RNP ("Required Navigation Performance") of the current segment. FIG. 9 presents an example of the "strip" of terrain analysed for each segment and the necessary overlaps.

Depending on the choices made regarding realization and sharing of processing operations between the available systems, this function CHECK can be calculated by the FMS or the ISS/TAWS.

Thus, when the terrain model is available internally in the computer of the FMS, the FMS is responsible for comparing each point predicted on the vertical profile with the altitude value adopted for the corresponding value of distance traversed.

On the other hand, when the terrain model is available externally in the ISS/TAWS computer, the FMS exports to the ISS/TAWS a geometric description of the lateral and vertical trajectory inspired, for example, by the content of the ARINC-702A protocol. The ISS/TAWS samples the 3D trajectory described by the FMS, with a regular interval fixed by the resolution of the terrain database used, the ISS/TAWS compares each sample with the altitude value adopted for the corresponding value of distance traversed, and it signals the points in conflict with the terrain to the FMS.

The invention claimed is:

1. A method of forming a 3D safe emergency descent trajectory for aircraft comprising the steps of:
   searching for at least one possible better trajectory allowing a secure continuation in relation to the relief and/or the surrounding conditions towards a homing point as soon as a situation requiring an unscheduled modification of the current trajectory occurs,
   wherein this trajectory is updated as a function of the alterations in the surrounding conditions, as a function of the information provided by the onboard sensors and/or outside information received.

2. The method according to claim 1, wherein the emergency descent trajectory results from a compromise between the obtaining of sufficient safety margins with respect to the surrounding terrain or to the zones to be avoided and the distance remaining to be travelled before a landing.

3. The method according to claim 1, wherein the appearance of a situation requiring an unscheduled modification of the current trajectory causes the acquisition and the characterization of conditions aboard the aircraft corresponding to a situation requiring an unscheduled descent to flight levels in proximity to reliefs.

4. The method according to claim 1, wherein the appearance of a situation requiring an unscheduled modification of the current trajectory causes the formulation of the vertical flight profile suited to the aerodynamic and structural possibilities of the aircraft for the management of the operational descent situation detected.

5. The method according to claim 1, wherein the appearance of a situation requiring an unscheduled modification of the current trajectory causes the formulation of the mapping of the geographical zones that can be reached according to the descent profile complying with the regulatory operational lateral margins with respect to the surrounding reliefs, to the controlled air navigation zones and to the risky atmospheric phenomena.

6. The method according to claim 1, wherein the appearance of a situation requiring an unscheduled modification of the current trajectory causes the sorting of the possible destinations for the aircraft according to priority rules imposed by the procedures applicable in the operational descent situation detected, the navigation capabilities of the aircraft, the determined geographical zones that can be reached as well as the preferences of the operating company.

7. The method according to claim 1, wherein the appearance of a situation requiring an unscheduled modification of the current trajectory causes the creation of an emergency flight plan section complying with the descent profile required and the regulatory operational margins.

8. The method according to claim 1, wherein the appearance of a situation requiring an unscheduled modification of the current trajectory causes the interaction with the crew allowing them to activate the functions used, to designate the desired destination for the aircraft and to select the activation of automation of the tracking of the trajectory thus scheduled.

9. The method according to claim 1, comprising several levels of functional complexity.

10. A device for providing a 3D emergency trajectory for aircraft, comprising:
   a computer,
   an operational situation detection device connected to said computer,
   a database of performance of the aircraft connected to said computer,
   a navigation database connected to said computer,
   a terrain database connected to said computer,
   a device connected to said computer for calculating vertical descent and holding profiles, for calculating speed along this profile, for calculating flight times, and times of transit through determined points of the trajectory,
   a device connected to said computer for drawing up the sorted list of the procedures implementable by the aircraft,
   a device connected to said computer for drawing up the mapping of the zones that it is possible to reach,
   a device connected to said computer determining the path required so as to reach the selected destination, and
   a device connected to said computer for evaluating the operational situation.

11. The device according to claim 10, comprising at least one of the following elements: a database of preference parameters of the company, data on the active aeronautical zones extracted from the navigation database or via the VHF or data communications, and a trajectory checking function.

* * * * *